(12) United States Patent
Lawry

(10) Patent No.: US 6,441,603 B1
(45) Date of Patent: Aug. 27, 2002

(54) OVERHEAD LINE RATING MONITOR

(75) Inventor: Daniel C. Lawry, Scotia, NY (US)

(73) Assignee: Shaw Intellectual Property Holdings, Inc., Baton Rouge, LA (US)

( * ) Notice: Subject to any disclaimer, the term of this patent is extended or adjusted under 35 U.S.C. 154(b) by 0 days.

(21) Appl. No.: 09/848,738

(22) Filed: May 3, 2001

(51) Int. Cl.⁷ .............................................. G01R 5/26
(52) U.S. Cl. ........................................................ 324/106
(58) Field of Search ............................... 324/106, 105, 324/111, 103 R, 104

(56) References Cited

U.S. PATENT DOCUMENTS

| | | |
|---|---|---|
| 4,268,818 A | 5/1981 | Davis |
| 4,420,752 A | 12/1983 | Davis |
| 4,553,092 A | 11/1985 | Purves |
| 4,584,523 A * | 4/1986 | Elabd .................. 324/105 |
| 4,758,962 A | 7/1988 | Fernandes |
| 4,806,855 A | 2/1989 | Davis |
| 5,140,257 A | 8/1992 | Davis |
| 5,235,861 A | 8/1993 | Seppa |
| 5,341,088 A | 8/1994 | Davis |
| 5,559,430 A | 9/1996 | Seppa |
| 5,933,355 A | 8/1999 | Deb |
| 6,097,298 A | 8/2000 | Brown |

\* cited by examiner

*Primary Examiner*—N. Le
*Assistant Examiner*—James Kerveros
(74) *Attorney, Agent, or Firm*—Kean, Miller, Hawthorne, D'Armond, McCowan & Jarman, L.L.P.

(57) ABSTRACT

A method and apparatus for determining the thermal capacity of overhead power lines is disclosed. The apparatus includes two rods of similar diameter and material properties to the line to be rated. One of the rods has a heater inside that dissipates a known amount of energy approximately equal to what the line loses during operation at the static rating. The rods are oriented parallel to the line and the temperature of each is measured. Using this information and standard equations governing the cooling of power lines, a very accurate, real-time reading of the line's thermal capacity is generated.

18 Claims, 3 Drawing Sheets

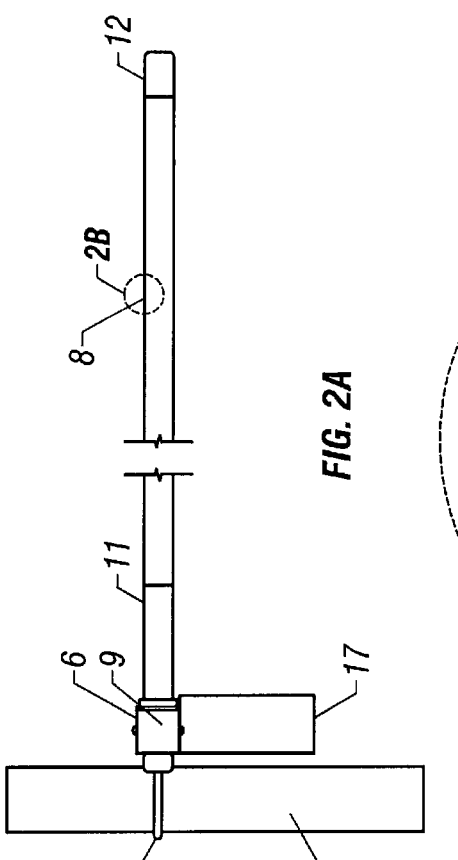
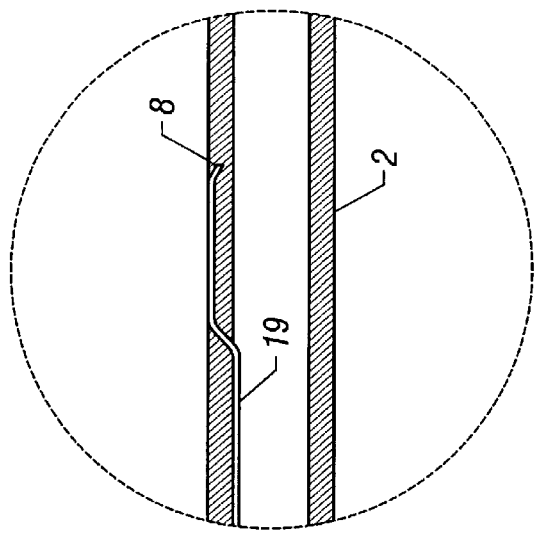
FIG. 2A
FIG. 2B
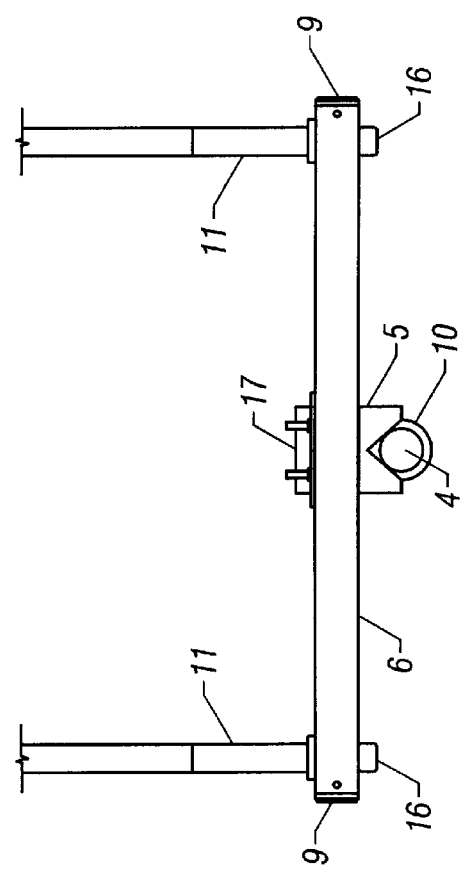
FIG. 1

OVERHEAD LINE RATING MONITOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of The Invention

This invention relates, generally, to a device and method for determining thermal capacity of overhead power lines.

2. Description of Related Art

Utility companies use overhead transmission and distribution power lines to carry electricity from their generation facilities to industrial and residential customers. As the population grows, so too does the demand for electricity. This increased demand requires a corresponding increase in the capacity of the infrastructure.

One solution to this problem is to build new power lines, but this is a very expensive undertaking due to the extensive labor and materials requirements. It can also be very difficult to obtain all the necessary permits and right-of-way access for the construction of new power lines. This combination of factors has led in recent times to a serious scarcity of power lines. In such a climate, it is extremely desirable to make maximum use of the lines currently in existence.

The capacity of an overhead power transmission line is limited by the heating of the line due to the inherent electrical resistance of the conductor. If a line is operated above its thermal rating, or ampacity, the current dissipated generates a level of heat that is both unsafe and damaging to the conductor. The amount by which the ampacity of a line is exceeded combined with the length of time the overloaded conditions persist determine the seriousness of the ill effects.

One consequence of exceeding the thermal rating of a line is that the conductor will expand beyond its design conditions. Some expansion due to heating is expected, and power lines are designed with a certain level of clearance to accommodate the resulting sag. However, as the temperature rises above the rated value, the increased sag can cause the line to contact objects such as trees, under-built lines, and other foreign objects. Another consequence of exceeding the thermal rating is that the conductor will become so hot that it loses tensile strength due to annealing of the metal. This will reduce the life of the conductor.

Repairing power lines that have been damaged by exceeding their thermal rating is very costly, both in terms of the materials and the lost use of the line. Additional costs are incurred if service to customers is interrupted. These costs include loss of revenue from the sale of power and losses for the customers due to the shutdown of their business. Such an event is also a public relations disaster for the servicing electric company.

Because the limiting factor of a power line is its operating temperature, all factors that affect temperature will also affect the capacity of the line. There are many such factors that have both drastic and subtle effects. For example, the power line dissipates heat by convection at a rate that is highly dependent on both the ambient temperature and the speed and direction of the wind relative to the line. The ambient temperature also affects the rate at which the line dissipates heat by radiation. Rain and other types of moisture can also have a large cooling effect when present. Counteracting these cooling effects, solar radiation adds heat to a line at varying rates depending on the latitude, time of day, cloud cover, and other factors.

Several of the factors mentioned above are difficult to quantify with much precision. For example, the wind speed and direction may be constantly changing, the sun may periodically pass behind a cloud, and rain intensity may fluctuate. Even the most sophisticated weather stations may not provide the quality of data required to accurately predict the rate at which a power line will be cooled by its environment.

Without good data to precisely predict the cooling rate, the worst possible weather effects must be assumed so that the lines are not overloaded. With respect to power lines, the worst weather effects occur on hot, sunny days with no wind. Most of the time conditions are not so poor, however, and the line could actually carry more power while remaining safely below the rated maximum conductor temperature. This uncertainty can result in the lost opportunity to safely transmit up to twenty percent more power over the course of a year than worst case conditions would allow.

Many methods are found in the prior art which try to narrow the gap between the rated capacity and the actual capacity. One method is to calculate the rating using weather conditions for the area as reported by various weather agencies. This is the easiest and least expensive way to increase the line rating, but the uncertainties involved in such an approach require that a large factor of safety be maintained. Weather stations in the vicinity of the line can also be installed and used to provide data. However, most cannot provide accurate readings of wind that drops below two miles per hour. A typical rotating anemometer will stall at these levels, and the bearings in rotating anemometers tend to degrade, increasing their stall speed further and eventually requiring maintenance. Measurement of solar input and precipitation greatly increases the cost of the weather monitoring equipment.

Another method, for which several designs exist in the art, involves measuring the temperature of the line directly. If an accurate reading is obtained, this method successfully enables the user to operate a line near full capacity. However, obtaining an accurate reading is quite difficult due to the extreme electric and magnetic fields that surround power lines. The known devices that are capable of performing these temperature readings are often very expensive, unreliable, or both. In addition, a large disadvantage exists in that when the load is low, the rating accuracy of this method is very poor. This inaccuracy is important because many lines are rated based on contingency loading. In other words, while the normal load may be low, the operator is required to know the rating in the event of a contingency.

Other designs with varying degrees of effectiveness measure either the sag or the strain in the line and extrapolate from that to determine the line temperature. Measuring the sag or strain of the line is also a direct indicator of whether clearance levels are in danger. These methods suffer the same disadvantage as the line temperature sensors in that ratings cannot be calculated at low load. Strain and sag monitors are also expensive. The strain monitor often requires a line outage to install, which is expensive and often impossible at certain times of the year.

U.S. Pat. No. 5,559,430 to Seppa discloses an apparatus that includes a replica of a portion of a power line. Thermocouples are included to measure the temperature of the replica and that of the ambient air. If full sun is assumed, this method allows for the calculation of an effective wind speed and rating. However, if the sun is partially hidden this estimation of the effective wind speed and rating is quite poor. Further, the apparatus is useless at night or other times when there is essentially no sunlight.

SUMMARY OF THE INVENTION

It is an object of the present invention to provide a method whereby the thermal capacity of an overhead power line can be accurately determined in real-time.

It is another object of the present invention to provide an apparatus to assist in the practicing of said method.

It is another object of the present invention to make said apparatus more accurate, more reliable, and yet significantly less expensive than those known in the art.

These and other objects are achieved, according to the invention, by an apparatus and method for determining all heat transfer effects present in an area. From that information the thermal capacity of a power line is calculated.

The preferred embodiment of the invention is an apparatus designed to utilize the IEEE 738 equations. The preferred embodiment comprises two cylindrical rods of approximately the same diameter and material properties of the line to be rated. The rods are placed such that the effects of wind, sun, and precipitation on the apparatus mirror those affecting the line. This is most easily accomplished by elevating the apparatus on a pole, separating the rods with a crossarm so they do not shield one another from weather effects, and aligning the rods parallel to the line.

Each of the rods has a thermocouple attached just under its surface near the longitudinal middle of the rod. The rods are of sufficient length so that the cooling out of the ends is insignificant compared to other effects. One of the rods has a resistive heater inserted into it designed to dissipate about the same amount of energy as the line operating at the static rating. A computer then uses the thermocouple readings and attributes of the apparatus to calculate the thermal rating according to the IEEE 738 equations.

BRIEF DESCRIPTION OF THE DRAWINGS

FIG. 1 is a top view of an embodiment of the invention.

FIG. 2A is a side view of an embodiment of the invention.

FIG. 2B shows the preferred placement of the thermocouples.

DETAILED DESCRIPTION OF THE INVENTION

Figure 3:
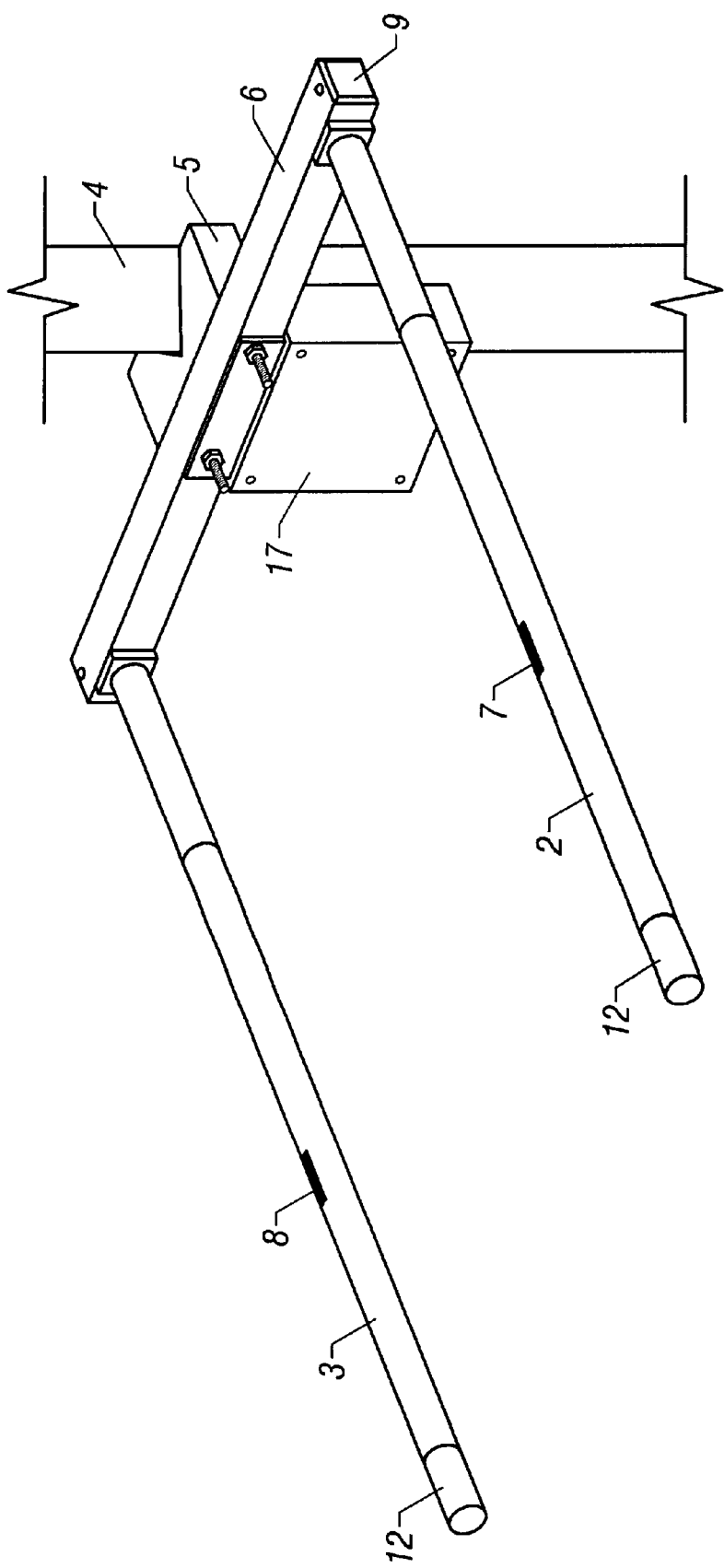
FIG. 3 is an isometric view of the invention.

FIGS. 1 and 2 depict an embodiment of the invention. The line rating monitor is comprised of mast 4, cross arm 6, cold rod 2, and hot rod 3. The rods are elevated on mast 4 and separated with cross arm 6 to ensure they are not shielded from weather effects. The rods are oriented parallel to the power line being rated to ensure that the rods experience the same wind and solar effects as the line.

In a preferred embodiment, the rods are made to have a similar diameter to the power line to be rated. This sizing makes application of the heat transfer equations more straightforward. Also, the rods should be constructed of a material with similar properties to the power line. Most power lines are constructed primarily of aluminum, making that the preferred material. However, numerous materials exist that are sufficiently similar. The surface of the rods should dulled with brushing and clear anodizing to make the radiative properties of the replica similar to that of the line.

Housed within hot rod 3 is a heat source, preferably one or more resistance elements. Constant wattage heater cable can also be used. The heat source is chosen such that it can create a similar amount of heat per unit distance as the power line when the line is operating near its static rating. The power dissipated by the line due to resistive ($I^2R$) losses is easy to estimate because the resistance of the line is known. In an alternative embodiment, the internal resistors are made to dissipate a variable amount of energy. Using a controller, the current to the resistors is altered such that the external temperature of hot rod 3 is approximately equal to the line's rating temperature. This will increase the accuracy of the monitor during high load conditions, when accuracy is most important. It will also increase the cost of the unit, however.

Cold rod 2 has cold thermocouple 7 fixed to its surface near the longitudinal middle of the rod. Similarly, hot rod 3 has hot thermocouple 8 fixed to it in the same manner. Cold thermocouple 7 measures the solar temperature, which corresponds to the no-current temperature of the line. Hot thermocouple 8 corresponds to what the temperature of the power line would be if the line were operating near its static rating.

Using the measurements from the two thermocouples and the wattage of the heater, the effective wind speed can be calculated. This calculation, as well as all others required to practice the invention, can be easily performed with a computer, a non-programmable calculator, or even a pencil and paper using the equations discussed below. The effective wind speed is a theoretical measurement that combines the cooling effects of wind, moisture, and the like into an equivalent, single vector value for the wind speed. In this way, the difficulty of estimating the effects of precipitation and other moisture is eliminated.

For applications that require only a determination of the effective wind speed, the algorithm below is quite effective. If the true direction of the wind is also desired, three pairs of rods can be set up oriented at 120 degrees to each other in the same plane. Each pair should have one hot rod and one cold rod. The three vector determinations of effective wind speed can be merged to determine the actual direction of the wind.

While limitless numbers of equations could be used, the determination of effective wind speed is most easily accomplished with the IEEE 738-1993 equations governing the cooling of power lines. These equations have the advantage that, in addition to being derived previously, they are generally accepted and widely used in the field. The first equation is a steady-state heat balance.

$$q_c + q_r = q_s + q_{gen} \tag{1a}$$

where:
 $q_c$=heat output due to convection;
 $q_r$=heat output due to radiation;
 $q_s$=heat input due to solar;
 $q_{gen}$=heat input due to resistive heating.

It can be proven that replacing all occurrences of the ambient temperature in the $q_c+q_r$ term above with the solar temperature (measured by cold thermocouple 7) and setting the heat input due to solar to zero yields an equivalent result. This eliminates the $q_s$ term entirely and obviates the need to measure the ambient temperature.

For power lines, $q_{gen}$ is equal to $I^2R$. Substituting and solving for the current, I:

$$I = \sqrt{\frac{q_c + q_r}{R(Tc)}} \quad (1b)$$

where R is the resistance of the conductor at its maximum allowable temperature (rating temperature). The current I is equal to the line rating if the conductor temperature within $q_c$ and $q_r$ is taken to be the rating temperature. Calculation of the line rating I is the ultimate object of the present invention.

The $q_c+q_r$ term is determined from the following equations:

$$q_{c1} = \left[1.01 + 0.371\left(\frac{D\rho_f V_w}{\mu_f}\right)^{0.52}\right] \cdot k_f \cdot (T_c - T_a) \quad (2a)$$

$$q_{c2} = 0.1695\left(\frac{D\rho_f V_w}{\mu_f}\right)^{0.6} \cdot k_f \cdot (T_c - T_a) \quad (2b)$$

$$q_{c3} = 0283 \rho_f^{0.5} D^{0.75}(T_c - T_a)^{1.25} \quad (2c)$$

$$q_r = 0.138 D\varepsilon \cdot \left[\left(\frac{T_c + 273}{100}\right)^4 - \left(\frac{T_a + 273}{100}\right)^4\right] \quad (3)$$

where:
$T_c$=conductor temperature
$T_a$=ambient temperature
D=conductor diameter;
$\rho_f$=density of air;
$V_w$=velocity of air stream;
$\mu_f$=absolute viscosity of air;
$k_f$=thermal conductivity of air;
$\varepsilon$=emissivity (0.23 to 0.91).

Equation 2a estimates the convective cooling at low wind speeds, Equation 2b estimates convective cooling at high wind speeds, and Equation 2c estimates the natural convective cooling at times of no wind. Under any given set of conditions, the equation that yields the largest value should be used for $q_c$. This will yield a conservative result for the overall convective cooling. The properties of air present in the equations should be taken at $T_{film}$, equal to $(T_c+T_a)/2$.

The invention calculates the line rating in the following way. In Equation 1a, every variable is known except for the wind direction and speed present in the $q_c+q_r$ term. The $q_{gen}$ term is equal to the wattage of the heater and the $q_s$ term is set to zero. As mentioned previously, the heat input due to solar, $q_s$, can be assumed to be zero if all occurrences of the ambient temperature in the equations are replaced with the solar temperature, $T_s$. The solar temperature is measured by cold thermocouple 7 on cold rod 2. The conductor temperature, $T_c$, is measured by hot thermocouple 8 on hot rod 3.

In this way, Equation 1a yields the effective wind speed. The value represents the wind speed (perpendicular to the line) that would produce the same overall cooling effect as all effects present in the vicinity of the overhead line rating monitor. Then, substituting this value into Equation 1b, the ampacity of the line under the current conditions is known.

The above algorithm helps to smooth undue rating variation which might be due to such effects as gusts of wind or scattered clouds passing in front of the sun. If the wind gusted near the monitor, the temperature reading from hot thermocouple 8 would not immediately reflect this due to the time constant of the rod. Therefore the calculated rating would not increase greatly due to the brief local wind gust. This is desirable, since the line rating is really proportional to the average cooling effect along the line, and not just at the monitor location. Likewise, during low wind conditions, the wind speed and direction naturally tend to fluctuate more in time and distance (along the line). The time constant of the rod (which is made similar to the actual line) results in a natural averaging of the rating. Rapid fluctuations in the rating are unusable by operators due to their limited time and unpredictability.

Turning now to the preferred configuration of the line rating monitor, FIGS. 1 and 3 show cold rod 2 and hot rod 3 separated by crossarm 6 and elevated on mast 4. Crossarm 6 is bolted at its center to mast clamp 5 and mast 4 with u-bolt 10. Crossarm 6 is preferably at least two feet long and constructed of aluminum. Near each end, two holes are made in crossarm 6 so that cold rod 2 and hot rod 3 can be inserted into crossarm 6 perpendicular to mast 4. Each hole on the side facing away from mast 4 is tapped for connection to the rods as discussed below. Junction box 17 is bolted to the underside of crossarm 6.

Junction box 17 houses a terminal strip which provides a place to make power and thermocouple connections. In the likely event the monitor is on a roof or otherwise near a building, the connections for junction box 17 can run down the pole and into the building. If the monitor is at a remote location, junction box 17 can serve an additional purpose. It can house any necessary data acquisition device as well as radio or telephone equipment to transmit the data to the computer site.

Figure 4:
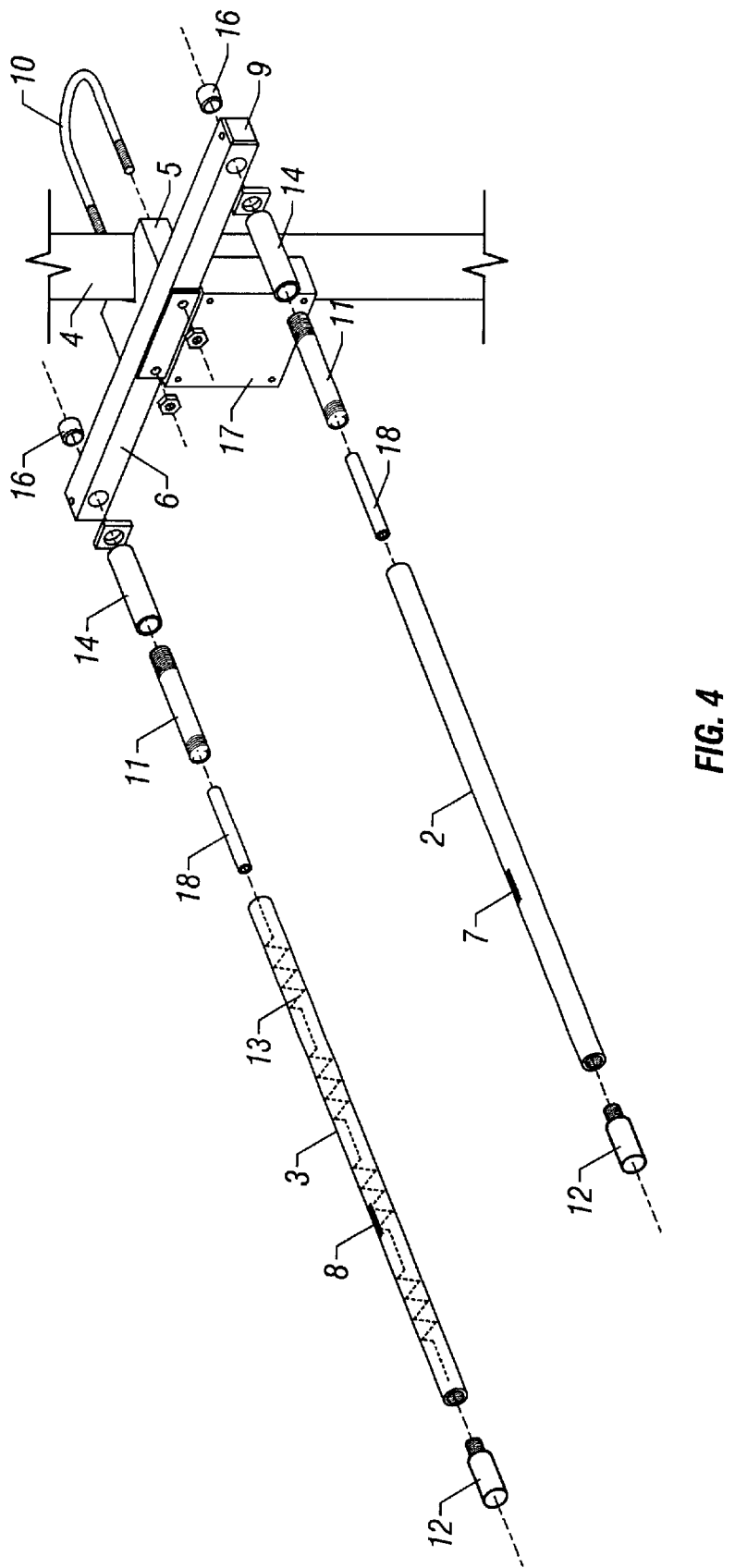
FIG. 4 is an exploded view of the invention.

FIG. 4 shows the preferred configuration of the aluminum rods. The rods should be constructed from thick-walled aluminum tubing. Tubing is chosen to provide the necessary cavity to house heater 13. The ends of the rods opposite crossarm 6 are sealed with rod plug 12, which should be made of Teflon and threaded to provide means of connecting rod plug 12 to the rods. Teflon provides a good thermal barrier and is resistant to both heat and UV rays. Heater 13 runs along the interior of hot rod 3. A power line running near its static rating dissipates between 15 and 30 watts of power per foot and this is the optimal power level for heater 13. Resistance heaters in general must be de-rated by fifty percent when running at the temperatures that will be present inside of hot rod 3. Therefore, it is recommended that heater 13 be rated for operation at 30 or 60 watts per foot. If desired, spacers can be used to center heater 13 inside of hot rod 3. However, because hot rod 3 has thick walls, the dissipation of heat will be fairly even without this component.

Crossarm 6 is shown in FIG. 4 along with nipple 11. Nipple 11 should be made of stainless steel pipe. Stainless steel provides the strength, corrosion resistance, and resistance to heat transfer required of the connector. Nipple 11 passes through crossarm 6 and out the other side. The side of nipple 11 that passes through crossarm 6 has an extended thread portion. These threads allow nipple 11 to be tightened onto crossarm 6 using brass cap 16 on the rear of crossarm 6 in combination with a nut on the front side. Hot rod 3 and cold rod 2, as shown in the FIG. 4, screw onto the other end of nipple 11. As with the free end of the rods, nipple 11 is sealed with nipple plug 18, also made of Teflon. The outside of nipple 11 is covered with sleeve 14, preferably made of Teflon, to prevent radiation and convection of heat. This will help prevent nipple 11 from bleeding heat away from hot rod 3.

Nipple 11 has a small hole in it near the end of the long threads that is within crossarm 6 after assembly. Wires from junction box 17 pass into crossarm 6 and into nipple 11 through this hole. Nipple plug 18 within nipple 11 has a hole drilled through its center through which the thermocouple and power wires then pass. The line supplying power to heater 13 simply connects to heater 13 at the point immediately inside of hot rod 3. The preferred configuration of thermocouple wire 18 is described below. All soldered connections inside of hot rod 3 should be made with high temperature solder. It is also desirable to have all wire inside hot rod 3 covered with ceramic braid to ensure proper resistance to heat.

FIG. 2A shows a side view of the invention including the position of hot thermocouple 8. FIG. 2B is a detailed view showing how the thermocouple wire 19 exits hot rod 3 through a hole drilled through the tube wall. Thermocouple wire 19 is passed to the outside to prevent it from conducting the elevated temperatures present inside the tube to the thermocouple. The wire then travels for approximately one inch along the outside of hot rod 3 in a groove machined to a depth approximately equal to the diameter of the wire. The groove is filled with high temperature, UV resistant adhesive and smoothed over. Near the longitudinal center of hot rod 3, thermocouple wire 19 terminates with hot thermocouple 8. Hot thermocouple 8 and cold thermocouple 7 are merely the stripped, twisted, and soldered ends of thermocouple wire 19. Of course, thermocouples are not absolutely required to practice the invention. Any means for measuring temperature known in the art will suffice. For example, thermistors, RTD's, or even an ordinary thermometer could be sufficient.

There are of course other alternate embodiments that are obvious from the foregoing descriptions of the invention, which are intended to be included within the scope of the invention, as defined by the following claims.

I claim:

1. An overhead line rating monitor for determining the ampacity of a power line having a rating temperature comprising:

a cold rod having means for measuring the temperature of said cold rod;

a hot rod having means for measuring the temperature of said hot rod;

a heat source internal to said hot rod, said heat source having a wattage; and means to calculate said ampacity based on said temperature of said cold rod, said temperature of said hot rod, and said wattage.

2. The overhead line rating monitor of claim 1 wherein said cold rod and said hot rod are oriented parallel to said power line.

3. The overhead line rating monitor of claim 1 wherein said cold rod and said hot rod each have approximately the same diameter as said power line.

4. The overhead line rating monitor of claim 3 wherein said cold rod and said hot rod are comprised of aluminum tubing.

5. The overhead line rating monitor of claim 1 wherein said heat source is a constant wattage heater cable.

6. The overhead line rating monitor of claim 1 wherein said heat source is comprised of a resistor.

7. The overhead line rating monitor of claim 1 further comprising:

a mast; and a crossarm, said crossarm attached to said mast at elevation and in a perpendicular manner;

wherein said hot rod and said cold rod are attached to said crossarm.

8. The overhead line rating monitor of claim 1 wherein said means to calculate said ampacity is comprised of a computer.

9. The overhead line rating monitor of claim 1 further comprising:

a controller;

wherein said controller varies said wattage such that said temperature of said hot rod is maintained at the rating temperature of said power line.

10. A method for determining the ampacity of a power line comprising the steps of:

providing a cold rod having means for measuring the temperature of said cold rod;

providing a hot rod having means for measuring the temperature of said hot rod;

providing a heat source internal to said hot rod, said heat source having a wattage; and calculating the ampacity of said power line based on said temperature of said cold rod, said temperature of said hot rod, and said wattage.

11. The method of claim 10 wherein said cold rod and said hot rod are oriented parallel to said power line.

12. The method of claim 10 wherein said cold rod and said hot rod have approximately the same diameter as said power line.

13. The method of claim 10 wherein said cold rod and said hot rod are comprised of aluminum tubing.

14. The method of claim 10 wherein said heat source is a comprised of a resistor.

15. The method of claim 10 further comprising the steps of:

providing a crossarm; and providing a mast;

wherein said hot rod and said cold rod are attached to said crossarm and said crossarm is elevated on said mast.

16. The method of claim 10 wherein said ampacity of said power line is calculated using a computer.

17. A device for measuring effective wind speed comprising:

a first cold rod having means for measuring the temperature of said first cold rod;

a first hot rod having means for measuring the temperature of said first hot rod;

a first heat source internal to said first hot rod, said first heat source having a first wattage; and means to calculate said effective wind speed based on said temperature of said first cold rod, said temperature of said first hot rod, and said first wattage.

18. The device for measuring effective wind speed of claim 17 further comprising:

a second cold rod having means for measuring the temperature of said second cold rod, said second cold rod oriented 120 degrees from, and in the same plane as, said first cold rod;

a third cold rod having means for measuring the temperature of said third cold rod, said third cold rod oriented 120 degrees from, and in the same plane as, said first cold rod and said second cold rod;

a second hot rod having means for measuring the temperature of said second hot rod; said second hot rod oriented oriented 120 degrees from, and in the same plane as, said first hot rod;

a third hot rod having means for measuring the temperature of said third hot rod, said third hot rod oriented 120 degrees from, and in the same plane as, said first hot rod and said second hot rod;

a second heat source internal to said second hot rod, said second heat source having a second wattage;

a third heat source internal to said third hot rod, said third heat source having a third wattage; and means to calculate the magnitude and direction of said effective wind speed based on said temperature of said first, second, and third cold rods, said temperature of said first, second, and third hot rods, and said first, second, and third wattage.

* * * * *